United States Patent [19]

Buhrke et al.

[11] Patent Number: 5,280,470
[45] Date of Patent: Jan. 18, 1994

[54] BANDWIDTH AND CONGESTION MANAGEMENT IN ACCESSING BROADBAND ISDN NETWORKS

[75] Inventors: Rolfe E. Buhrke, Westchester; Robert B. Dianda, Wheaton; Vikram Punj, Naperville; Ronald A. Spanke, Wheaton, all of Ill.; Nancy S. Stevens, Silver Spring, Md.

[73] Assignee: AT&T Bell Laboratories, Murray Hill, N.J.

[21] Appl. No.: 13,130

[22] Filed: Feb. 3, 1993

Related U.S. Application Data

[63] Continuation of Ser. No. 616,541, Nov. 21, 1990, abandoned.

[51] Int. Cl.⁵ .................... H04L 12/56; H04L 12/26
[52] U.S. Cl. .................... 370/13; 370/60.1; 370/94.2; 370/17
[58] Field of Search .................... 320/60, 60.1, 94.1, 320/94.2, 16, 17, 13

[56] References Cited

U.S. PATENT DOCUMENTS

| | | | |
|---|---|---|---|
| 4,984,264 | 1/1991 | Katsube | 370/60 |
| 4,993,024 | 2/1991 | Quinquis et al. | 370/94.1 |
| 5,007,043 | 4/1991 | van den Dool et al. | 370/94.1 |
| 5,007,048 | 4/1991 | Kowalk | 370/94.1 |
| 5,014,260 | 5/1991 | Wicklund | 370/94.1 |

OTHER PUBLICATIONS

Document T1S1.1/88-249, "Broadband Aspects of ISDN", Northern Telecom, Inc., (Title: ATM Performance and Congestion Control), San Diego, Calif., Jul. 18-22, 1988, pp. 2-3.
Document T1S1.1/88-417, "Broadband Aspects of ISDN", Bellcore, (Title: On Congestion Control in ATM Networks), Oct. 10, 1988, pp. 1-5.
Document T1S1.1/88-433, "Broadband", Northern Telecom, Inc., (Title: ATM Congestion Control—Functional Requirements), New Orleans, La., Oct. 10, 1988, pp. 1-6.
Document T1S1.1/89-32, "Broadband Aspects of ISDN", Bellcore, (Title: A Policing Algorithm for ATM Networks), Mar. 6, 1989, pp. 1-2.
Document T1S1.1/89-076, "ISDN Broadband Aspects", GTE, (Title: Motivation for an ATM Congestion Control Strategy Free From Catastrophic Congestion), Phoenix, Ariz., Mar. 6-10, 1989, pp. 1-4.
Document T1S1.1/89-077, "ISDN Broadband Aspects", GTE, (Title: An ATM Congestion Control Strategy Free From Catastrophic Congestion), Phoenix, Ariz., Mar. 6-10, 1989, 7 pp.
Document T1S1.1/89-224, "Broadband", Digital Equipment Corporation, (Title: Congestion Issues in Broadband ISDN), East Brunswick, N.J., May 15, 1989, pp. 1-4 and cover sheet w/abstract.
Document T1S1.1/89-229, "ISDN Broadband Aspects", GTE, (Title: ATM Traffic Descriptors and Bandwidth Enforcement), East Brunswick, N.J., May 16, 1989, 3 pp.
Document Study Group 18, D.72, "CCITT", NTT, (Title: Cell Header Function—Congestion Control), Jan.-Feb. 1989, 3 pp.
Document T1S1.5/90-???, "Broadband ISDN", AT&T (Title: Bandwidth Parameters), Apr. 16-20, 1990, pp. 1-4.

Primary Examiner—Wellington Chin
Attorney, Agent, or Firm—Werner Ulrich

[57] ABSTRACT

This invention relates to a method and apparatus for controlling overload in a data network. The exemplary embodiment is a Broadband Integrated Services Digital Network (B-ISDN) in which data is transmitted within data cells included in a larger data frame using the Asynchronous Transfer Mode (ATM) protocol. In response to the network detecting overload, the network sends slow down messages to selected virtual channels to decrease their data rates. The network also acts to block or decrease resource allocations to transmission requests that are likely to overload the network.

44 Claims, 4 Drawing Sheets

FIG. 4

BANDWIDTH AND CONGESTION MANAGEMENT IN ACCESSING BROADBAND ISDN NETWORKS

This application is a continuation of application Ser. No. 616,541, filed on Nov. 21, 1990, abandoned.

TECHNICAL FIELD

This invention relates to methods and apparatus for handling overload in data networks.

PROBLEM

Telecommunications networks can be organized to set up circuit connections between end terminals or to set up connections such as packet switched connections which are typically characterized by transmitting signals at a variable rate. When the network only establishes circuit connections, the decision on access to the network is relatively straightforward: if a circuit is available to the destination, a connection may be set up and if no such circuit is available no connection is set up. When a variable bit rate connection is requested, the situation is much more complex. The network depends on the statistics of input traffic and on intermediate buffering to ensure that all of the signals transmitted between terminals, including computer workstations, connected to the network can in fact be so transmitted. Signals are transmitted over "virtual channels" for interconnecting data sources and destinations which are used only when signals are actually to be transmitted, thus making the physical channels available to other virtual channels when no signals are being transmitted. In particular, for a broadband network, such as a broadband Integrated Services Digital Network (B-ISDN) to which is attached a large number of broadband terminals, each of which can generate signals of high bandwidth for its virtual channels, the potential signal traffic of all virtual channels which may at one time be connected to the network in an active state can far exceed the capability of the network to transmit such signals.

The data transmission protocol within a broadband ISDN is Asynchronous Transfer Mode (ATM) which utilizes short fixed length data cells. These cells then form the basic atomic unit for the transmission of signals within a broadband ISDN. A frame, a basic unit for packet data transmission, is transported across the broadband ISDN by segmenting it into a plurality (not necessarily an integral number) of short fixed length data cells and transporting those cells across the network. The B-ISDN network accepts signals at a STS-3C rate of 155.52 megabits per second (Mb/s). Terminals connected to such a network may generate signals to transmit or receive at a 155.52 Mb/s rate. It is characteristic of the virtual channels of many of the terminal devices connected to a broadband ISDN network that they do not continuously generate traffic at their peak data rates. In other words, the terminal output tends to be bursty. For a B-ISDN network, if all virtual channels were to generate bursts simultaneously, the instantaneous bandwidth could far exceed the output bandwidth of the network. The broadband network can take advantage of the statistical nature of their burstiness to accept and process traffic whose instantaneous peak could far exceed the capacity of the network. However, there is at present no good way to allow access to the network by virtual channels whose combined peak bandwidth is in excess of the basic input bandwidth allowed by the network.

In the prior art, it has been proposed that access to a network be provided by dedicating bandwidth to each of the terminals requesting such bandwidth and limiting this dedicated bandwidth to the output bandwidth of the network. Such a scheme while protecting the network from overload, tends to sharply underutilize the capabilities of the network since advantage cannot be taken of the short term statistical variations of the input traffic. In other words, such a network is engineered to the peak bandwidth requirement.

Another prior art solution is the flow/congestion control scheme of the Consultative Committee for International Telephone and Telegraph (CCITT) X.25 standard. This arrangement permits a specifiable number of data entities (packets) to be transmitted before an acknowledgment must be returned; the acknowledgment message can be delayed to reduce data traffic. Further, X.25 receivers can send an explicit request to turn down packet traffic via a "Receiver not ready" message. Such an arrangement responds to peaks of traffic slowly, restores normal operation slowly, and requires that the network terminate traffic above layer 1.

Accordingly, in the prior art there is no efficient arrangement available for avoiding network overload to a broadband variable bit network while retaining the efficient utilization of the network and the input terminals to that network.

SOLUTION

The problem of the prior art is solved and an advance is made in accordance with the principles of the invention wherein when the network detects temporary overload, the network transmits slowdown messages to connected virtual channels to further shape the rate of transmission of signals by temporarily substituting tighter values of the emission control parameters. In one exemplary embodiment, such slowdown messages are sent with a high level of priority so that they can be received very quickly by the sources of traffic. Such slowdown messages may either have permanent effect until a resume message is received; have temporary effect and require a repeat of the slowdown message to be effective for more than one interval; or specify the number of intervals to be covered before automatically resuming the normal transmission in the absence of another slowdown message. These signals are conveyed by layer 1 and do not require the network to terminate higher layers of protocol in order to provide background flow/congestion control.

A call from a terminal is defined by a virtual channel and its associated plurality of bandwidth emission control parameters; the peak bursts of traffic from such a terminal are then shaped by these parameters. Advantageously, in accepting such a call, the network input received from that terminal is limited by these parameters. In accordance with one specific implementation of the invention, the virtual channel emission control parameters include a first parameter which defines the number of cells which a terminal may not use between any pair of cells conveying data from that terminal, a second emission control parameter limiting the number of cells which may be transmitted in an interval, and a third parameter specifying the length of the interval. In one specific implementation, this interval is 6 milliseconds and is the same interval for all terminals connected to the network. The network will consider a request from the terminal for a connection with prespecified parameters and accept or deny the request according to whether sufficient capacity is available. In accordance with one aspect of the invention, the network can negotiate with the terminal concerning the parameters by providing an alternate lower value for the virtual channel emission control parameters for a specific call. In other implementations, the terminal may simply retry with the same or different values of emission control parameters after receiving a rejection.

The terminal equipment is typically not under the control of the provider of the broadband network services. Therefore, it is necessary to find arrangements for enforcing the limits which have been prespecified to and by the terminal when the call was accepted. In accordance with one aspect of the invention, each virtual channel is monitored to ensure that the virtual channel bandwidth emission control parameters for that virtual channel for that call are not exceeded. This process of monitoring traffic is combinable with the process for determining charges for the use of the broadband network. The process is also required since customers are likely to be charged for the virtual channel bandwidth that they have requested or been assigned for a call so that it is important that arrangements are available to detect if they are in fact transmitting at a higher rate. In accordance with one aspect of the specific embodiment, the number of cells transmitted per unit interval is averaged over a longer interval in the policing process in order to account for jitter (e.g., due to multiplexing devices on customer premises causing variable delay for ATM cells of the same virtual channel) at the input to the broadband network. The policing could be done only on the bandwidth emission control parameter that limits the number of cells per 6 milliseconds since this is the parameter that controls the bandwidth.

The intercell spacing parameter limits spacing between cells on a particular virtual channel. The intercell spacing parameter allows the broadband network to operate more efficiently and to reduce collisions between cells from several interfaces that are to be transmitted on a single outgoing interface.

In another embodiment of the invention, a peak rate and an average rate of transmission of data cells is specified for a virtual channel. The virtual channel generates data cells at a rate limited to the average rate, and restricted to the specified peak rate. The peak rate, which for a leaky bucket is the fill rate, is tied to the minimum intercell spacing. The average rate is determine by the drain rate of a leaky bucket, the size of the leaky bucket being used as a third flow control parameter.

DETAILED DESCRIPTION

A plurality of data sources, typically terminals, are connected to the ports of a broadband ISDN network usually through a network termination device. The higher speed terminals that are connectable to a B-ISDN network must, in general be capable of controlling the rate at which they transmit data signals to the B-ISDN network. For terminals which are incapable of varying this rate, it is necessary to establish the equivalent of a circuit connection through the B-ISDN network wherein a steady flow of signals at the data rate of the sending terminal can be guaranteed. For terminals which can control their rate of data generation, and it is these types of terminals to which the principles of the present invention apply, it is necessary to restrict the rate at which data signals for conversion into cells are generated. In accordance with the principles of this invention, this restriction takes two forms: a very short term restriction determined by the intercell spacing and a short term restriction determined by the maximum number of cells in one interval. The very short term restriction ensures that successive cells from data of a given terminal, transmitting over a given virtual channel, are generated with a minimum intercell interval. If necessary, this minimum intercell interval is enforced by transmitting empty cells from the terminal, but successive active cells from a given terminal for a given virtual channel are limited to a spacing that is a basic parameter of a particular call connection between that terminal and a destination. The short term limitation is a limitation on the number of cells for which signals may be generated by the terminal during a prespecified interval, or the long term average number of cells per second. The typical such prespecified interval is 6 milliseconds, a number which could be standard throughout the B-ISDN network. However, it is possible to use different limits in different parts of the network and/or to use different limits for different kinds of terminals. For example, for a device such as a video signal generator, whose average data rate is typically uncontrollable or controllable only in a small number of different steps, the predetermined interval may be determined more by the size of the receive buffer for assembling the video signals. The 6 millisecond figure is selected to match the size of storage available in nodes of the B-ISDN network; 6 milliseconds is the intercell time for a 64 kilobit per second virtual channel. A larger or smaller interval would be used for different amounts of network storage.

Alternatively, a leaky bucket arrangement provides added flexibility by permitting up to a peak rate to be sustained until the bucket is full, then limiting the rate while the bucket is full to the drain rate of the bucket. With a leaky bucket arrangement, augmented by a fill rate limiter, the three parameters are the intercell spacing (peak rate), drain rate (average rate), and size of the bucket (controls averaging interval).

The choice of the virtual channel(s) whose output is to be limited may be made in a number of different ways. If a priority scheme is in use, lower priority virtual channels are preferred candidates. High bandwidth virtual channels are also preferred candidates. Active virtual channels are preferred candidates since little is gained by reducing the output bandwidth of inactive virtual channels. Channels which have cells queued up in internal buffers are preferred candidates because these cells are actually the cells causing a congestion build-up. Any virtual channel which has been exceeding its allotted average bandwidth for a substantial time is a preferred candidate. When congestion is discovered, enough bandwidth reduction from enough virtual channels must be achieved to remove the congestion.

Figure 1:
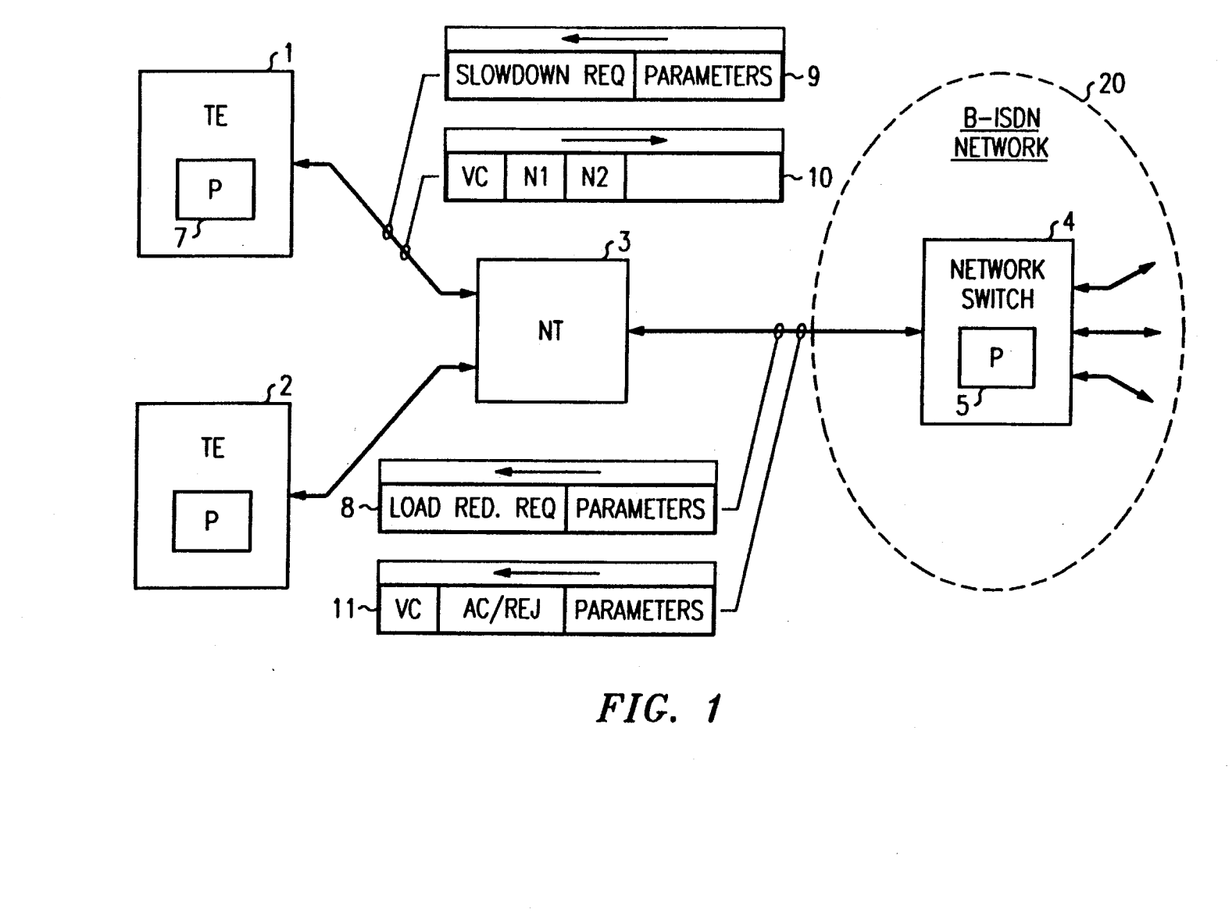
FIG. 1 is a block diagram of an exemplary data network and messages exchanged between units to implement the invention.

FIG. 1 is a block diagram showing terminal equipment 1 and 2 connected to a network termination 3 which in turn is connected to a network switch 4 that is part of a broadband data network 20. The terminal equipment (such as TE1, TE2) sends a request for the establishment of a virtual channel to a specified destination and requests that the virtual channel be characterized by a cell rate of no more than one cell for every N1, which need not be an integer, cells transmitted from TE1 and no more than N2 cells transmitted over that virtual channel per 6 milliseconds. This information is conveyed in a single or multiple cell message 10 sent from terminal equipment 1 to the network switch 4. In response, the network switch 4 sends back the message 11 identified by the number of virtual channel with an accept/reject indication and any additional parameters required, such as a retry time for a reject message. The terminal equipment, such as TE1 is controlled by a processor 7, operative under the control of a program within the processor 7. Network switch 4 is controlled by a processor 5, operative under the control of a processor within processor 5.

In alternative embodiments, the network terminal 20 sends not just a rejection but an acceptable value of N1 and N2 in case the levels requested by the terminal equipment for that virtual channel are too high. A simple accept/reject has the advantage that the responsibility for trying an alternate value of N1 and N2 rests with the terminal equipment which may not be able to use lower values and for which it would be better simply to wait and try again. Also, with the accept/reject arrangement it is not necessary for the network termination equipment to reserve the bandwidth associated with the offered alternative. If a request to set up the virtual channel is rejected, no resources need to be set aside.

If the virtual channel has been set up and it is now necessary to throttle the rate of active cells being submitted to B-ISDN network 20 at the ingress network switch 4, this switch sends a load reduction request message 8, including load reduction parameters to the network terminal. This is a request to reduce the rate of cells for a predefined period or to specify lower leaky bucket fill, drain, and size parameters. The load reduction request is forwarded from the B-ISDN network 20, via the network termination 3, to terminal equipment 1. The load reduction request message has the effect of increasing the N1 factor and decreasing the N2 factor by a predetermined schedule, or by parameters of the message.

Following the lapse of that period, normal traffic levels are resumed unless in the meantime a new load reduction request message has been received. Alternatively, the length of the period may be specified in the message. Alternatively, load resumption messages are required to turn off the effect of a load reduction request so that the load reduction request remains in force until a resumption message is received. The latter arrangement has the advantage of enforcing a positive signal as a means of turning off the load reduction, but has the disadvantage that if the resumption message is lost, the load reduction remains in effect longer, until a timeout interval has elapsed.

Figure 2:
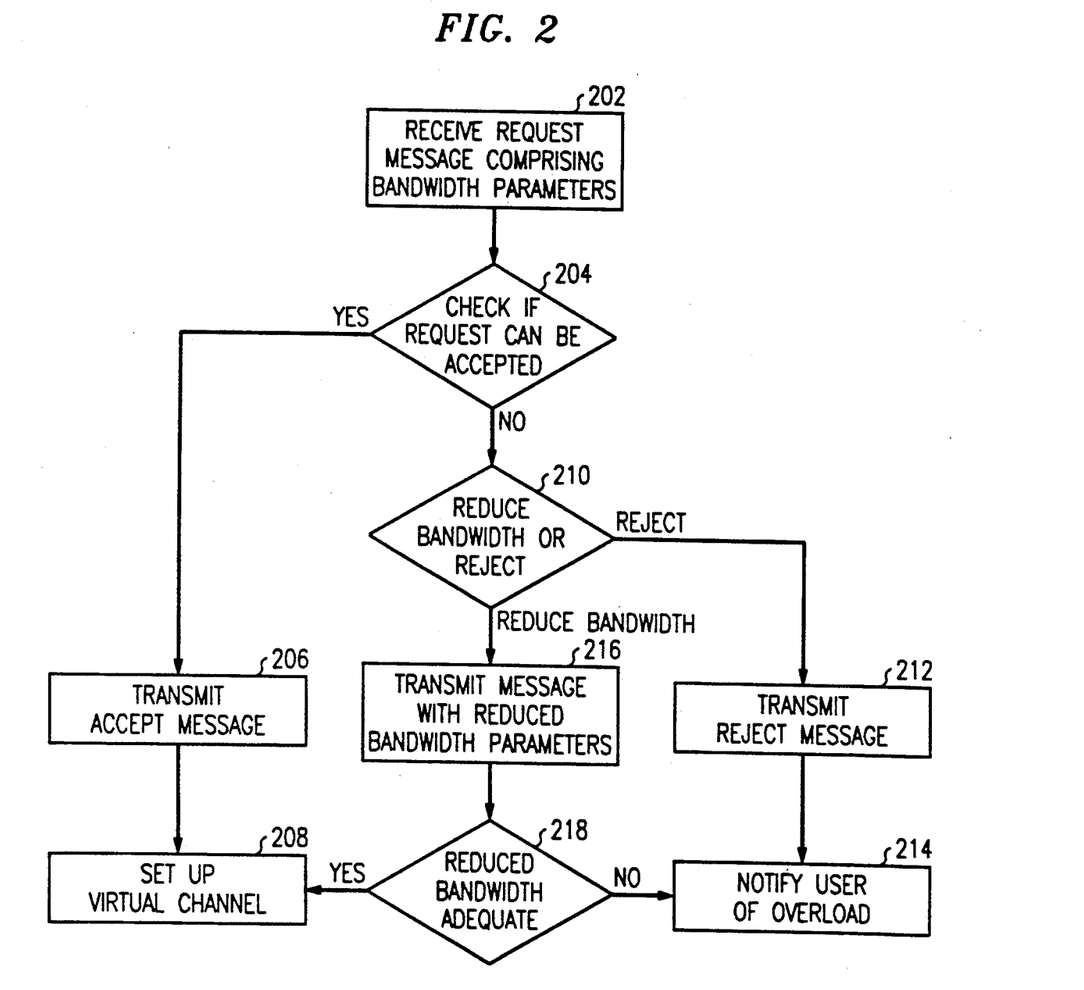
FIGS. 2-4 are flow diagrams of actions required to implement the invention in the network of FIG. 1.

FIG. 2 is a flow diagram of actions performed to implement the invention. The actions are performed in program-controlled processor 5 of the network switch, and program-controlled processor 7 of the terminal. A request message is received in the network switch from a terminal (action block 202). The network switch checks whether the request can be accepted (test 204). The test is made taking into account the present load leaving the network termination and the load that the network switch will accept at this time. If an additional virtual channel with the bandwidth parameters specified in the request message can be accepted (positive result of test 204), then an accept message is transmitted back to the terminal (action block 206) and actions are taken to set up a virtual channel from the terminal (action block 208). If the result of test 204 is negative, a further test is made whether a reduced bandwidth virtual channel can be accepted or whether the request should be totally rejected. A reduced bandwidth virtual channel can be accepted if substantial additional load, although less than the requested load, can be accepted. If the result of test 210 is negative, then a reject message is sent to the terminal (action block 212) and the terminal notifies the user of the overload (action block 214). If a reduced bandwidth virtual channel can be accepted, then a message is transmitted from the network switch to the terminal to indicate the reduced bandwidth parameters for an acceptable virtual channel (action block 216). The terminal tests whether this reduced bandwidth is adequate (test 218) and if so performs the actions for setting up a virtual channel (action block 208). If the reduced bandwidth is inadequate, the connection is rejected by the terminal and the user is notified of the overload (action block 214).

Figure 3:
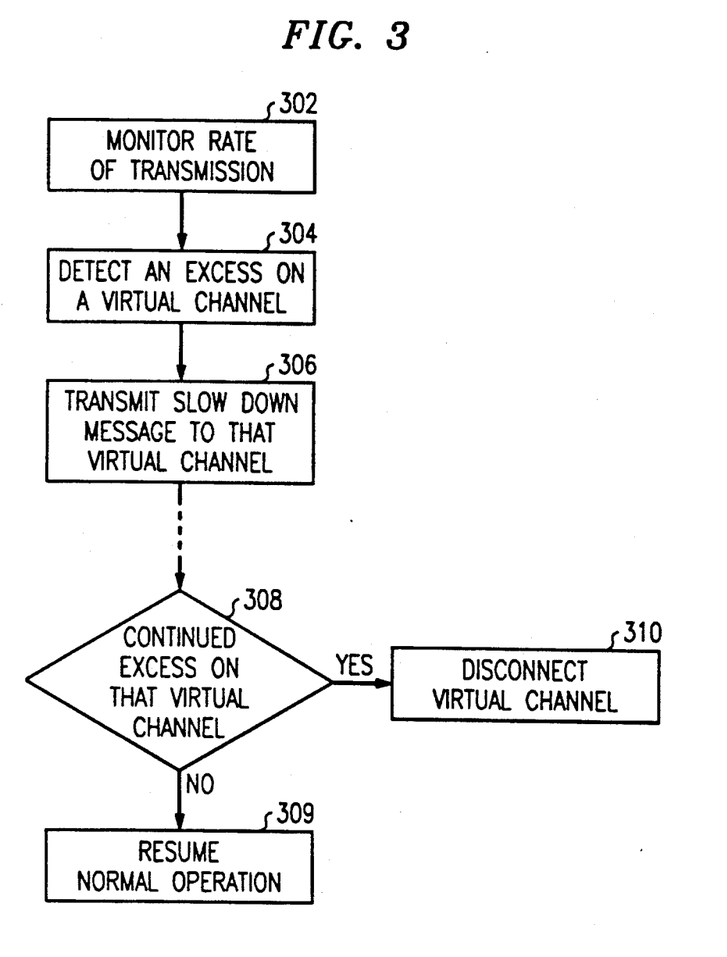

FIG. 3 is a flow diagram of the process of monitoring and the actions taken when a virtual channel transmits at a rate in excess of the rate specified by the parameters for that virtual channel. The rate of transmission is monitored (action block 302) by the transmission process. This is performed in network switch 4. If a virtual channel exceeds its allowed transmission rate as determined by the parameters for that virtual channel, then this excess is detected (action block 304). In response to this detection, a slow down message is sent to the terminal transmitting for that virtual channel (action block 306), the slow down message having parameters for a lower bandwidth transmission rate. In the meantime, excess cells are dropped or tagged for potential dropping. If, sometime thereafter, a continued excess transmission rate exists on that virtual channel, as detected in action block 308, then the virtual channel is disconnected (action block 310). The disconnection may be preceded by a warning message to give the terminal controlling the virtual channel an opportunity to limit the transmission rate.

Figure 4:
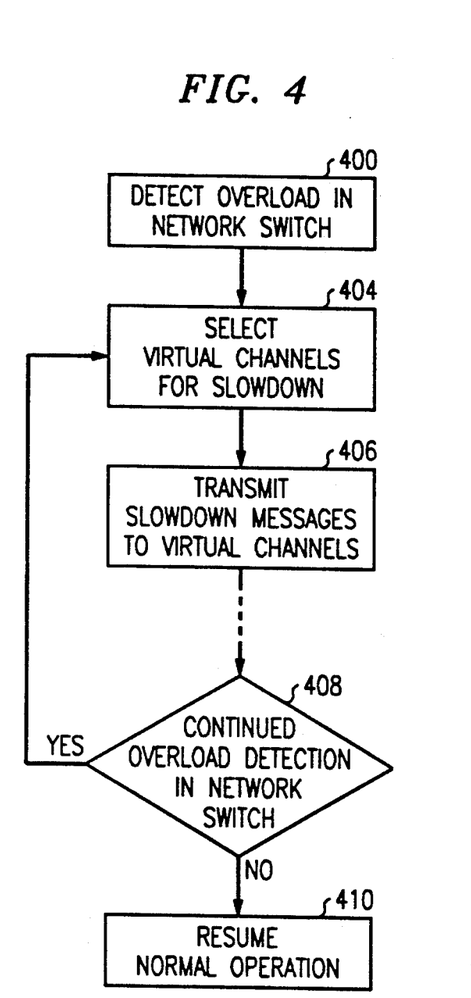

FIG. 4 is a flow diagram of actions performed in response to overload. Overload is detected in the network switch (action block 400). If overload is detected in the network switch, virtual channels are selected for slow down (action block 404). Slow down messages for these virtual channels are transmitted to the terminals serving these virtual channels (action block 406). If, after the elapse of time, a continued overload exists as detected in test 408, the process of selecting virtual channels for slow down (action block 404) and the transmission of slow down messages (action block 406) to these virtual channels is continued. These actions are also performed in response to the detection of continued overload in the network termination. After the overload disappears, normal operation is resumed by letting the timing of the slow down messages lapse so that the effect of the slow down messages disappears. If slow down messages are used which do not have a time but which are indefinite, then messages to undo the slow down messages must be sent (process not shown).

It is to be understood that the above description is only of one preferred embodiment of the invention. Numerous other arrangements may be devised by one skilled in the art without departing from the scope of the invention. The invention is thus limited only as defined in the accompanying claims.

We claim:

1. In a data network connected via an ingress switch to a plurality of data terminals, each terminal for serving at least one virtual channel, said ingress switch having a capability for serving a maximum data traffic load from said data terminals and from said network, a method of throttling input to the network, comprising the steps of:

detecting in said ingress switch of said data network that a load submitted from said data terminals and from said network exceeds said maximum data traffic load; and responsive to said detecting, selectively transmitting slow down messages for changing at least one parameter, said at least one parameter used for controlling the rate of transmission of data over a virtual channel, in a direction to reduce said rate of transmission to said ingress switch of said network from ones of said virtual channels.

2. The method of claim 1, further comprising:

in one of said virtual channels, responsive to reception of a slow down message, decreasing a limit on a peak rate of transmission of data on said one virtual channel.

3. The method of claim 2 wherein said network is a broadband data network, transmitting data in cells, wherein said step of decreasing comprises decreasing a number of cells that may be transmitted per unit time from said terminal.

4. The method of claim 3 wherein said step of decreasing comprises providing a higher minimum intercell spacing parameter.

5. The method of claim 1 wherein said network supports priority message service and wherein said step of selectively transmitting comprises selectively transmitting slow down messages at a high priority level.

6. In a data network connected to a plurality of data terminals each for serving at least one virtual channel, a method of throttling input to the network, comprising the steps of:

detecting an overload in said data network; and responsive to said detecting, selectively transmitting slow down messages, for changing at least one parameter, used for controlling the rate of transmission of data over a virtual channel, in a direction to reduce said rate of transmission, to ones of said virtual channels;

wherein said network supports priority message service and wherein said step of selectively transmitting comprises selectively transmitting slow down messages at a high priority level;

wherein said network is a broadband data network, transmitting data in cells, and wherein said selectively transmitting high priority messages comprises transmitting said high priority messages as groups of high priority cells.

7. The method of claim 1, wherein ones of said virtual channels are assigned transmission rate parameters for limiting a rate of transmission from said ones of said virtual channels, further comprising monitoring a rate of transmission from said ones of said virtual channels.

8. The method of claim 7 further comprising:

responsive to detecting, in said monitoring step, a transmission rate for one of said terminals in excess of a rate assigned by said transmission rate parameters to said one of said virtual channels, transmitting a slow down message to said one terminal.

9. The method of claim 7 further comprising:

responsive to detecting, in said monitoring step, a transmission rate for one of said terminals in excess of a rate assigned by said transmission rate parameters to said one of said virtual channels, disconnecting said one virtual channel.

10. The method of claim 1 further comprising:

in one of said virtual channels, responsive to reception of a slow down message, decreasing a limit on an average rate of transmission of data by said one virtual channel.

11. The method of claim 10 wherein said limit is specified by providing a leaky bucket drain rate parameter.

12. The method of claim 1 further comprising:

in one of said virtual channels, responsive to reception of a slow down message, decreasing a limit on a peak rate of transmission of data by said one virtual channel.

13. The method of claim 12 wherein said limit on a peak rate is specified by providing a fill rate parameter for a leaky bucket transmission rate control.

14. The method of claim 13 wherein a time of said peak rate is specified by providing a leaky bucket size parameter and a leaky bucket drain rate.

15. In a data network connected to a plurality of data terminals each for serving at least one virtual channel, a method of throttling input to the network, comprising the steps of:

detecting an overload in said data network;

responsive to said detecting, selectively transmitting slow down messages, for changing at least one parameter, used for controlling the rate of transmission of data over a virtual channel, in a direction to reduce said rate of transmission, to ones of said virtual channels;

responsive to receiving a request message for transmission from a virtual channel to said network, said request comprising at least one requested bandwidth parameter, determining whether said request can be accommodated without overloading said network; and responsive to determining that said request cannot be accommodated without overloading said network, transmitting to said virtual channel a response message comprising at least one bandwidth parameter for a bandwidth lower than a bandwidth for said at least one bandwidth parameter received in said request message.

16. The method of claim 15 wherein said network is a broadband network transmitting data in cells, wherein said at least one bandwidth parameter received in said request message comprises a minimum intercell spacing parameter.

17. The method of claim 15 wherein said network is a broadband network transmitting data in cells, wherein said at least one bandwidth parameter received in said request message comprises a parameter specifying a maximum number of cells which may be transmitted during a prespecified interval.

18. The method of claim 15 wherein said network is a broadband network transmitting data in cells, wherein said at least one bandwidth parameter received in said request message comprises a parameter specifying a maximum number of cells which may be transmitted during an interval specified in said request message.

19. The method of claim 15 wherein said network is a broadband network transmitting data in cells, wherein said at least one bandwidth parameter received in said request message comprises parameters, including a fill rate parameter, for a leaky bucket transmission rate limit.

20. The method of claim 15 wherein said network is a broadband network transmitting data in cells, wherein said at least one bandwidth parameter received in said request message comprises a parameter specifying a maximum number of cells which may be transmitted during a specified interval.

21. In a data network connected to a plurality of data terminals each for serving at least one virtual channel, a method of throttling input to the network, comprising the steps of:
   detecting an overload in said data network;
   responsive to said detecting, selectively transmitting slow down messages, for changing at least one parameter, used for controlling the rate of transmission of data over a virtual channel, in a direction to reduce said rate of transmission, to ones of said virtual channels;
   responsive to receiving a request message for transmission from a virtual channel, said request comprising at least one requested bandwidth parameter, determining whether said request can be accommodated without overloading said network; and
   responsive to determining that said request cannot be accommodated without overloading said network, transmitting to said virtual channel a reject response message.

22. In a data network connected to a plurality of data terminals each for serving at least one virtual channel, a method of throttling input to the network, comprising the steps of:
   detecting an overload in said data network; and
   responsive to said detecting, selectively transmitting slow down messages, for changing at least one parameter, used for controlling the rate of transmission of data over a virtual channel, in a direction to reduce said rate of transmission, to ones of said virtual channels;
   wherein said slow down messages each comprise a parameter defining the length of time for which effect of said each slow down message is to be activated.

23. In a data network connected to a plurality of data terminals each for serving at least one virtual channel, a method of throttling input to the network, comprising the steps of:
   detecting an overload in said data network; and
   responsive to said detecting, selectively transmitting slow down messages, for changing at least one parameter, used for controlling the rate of transmission of data over a virtual channel, in a direction to reduce said rate of transmission, to ones of said virtual channels;
   wherein said slow down messages are each effective for a predetermined interval of time.

24. The method of claim 1 wherein each of said slow down messages is canceled by receipt of a restore to normal message.

25. In a data network connected via an ingress switch to a plurality of data terminals each for serving at least one virtual channel, a method of throttling input to the network, comprising the steps of:
   detecting an overload in said data network; and
   responsive to said detecting, selectively transmitting slow down messages, for changing at least one parameter, used for controlling the rate of transmission of data over a virtual channel, in a direction to reduce said rate of transmission, from said ingress switch of said network to ones of said virtual channels;
   wherein said network supports a plurality of priority levels for different virtual channels, and wherein said ones of said virtual channels to which slow down messages are transmitted are selected on the basis of a priority of said ones of said virtual channels.

26. The method of claim 1 wherein said ones of said virtual channels are selected on the basis of bandwidth of said ones of said virtual channels.

27. The method of claim 1 wherein said ones of said virtual channels are selected on the basis of activity of said ones of said virtual channels.

28. The method of claim 1 wherein said ones of said virtual channels are selected on the basis of internal congestion of said ones of said virtual channels.

29. The method of claim 1 wherein said ones of said virtual channels are selected on the basis of buffer occupancy of said ones of said virtual channels.

30. In a broadband data network, transmitting data in cells, supporting priority services, connected to a plurality of data terminals each for serving at least one virtual channel, a method of throttling input to the network, comprising the steps of:
   detecting an overload in said data network;
   responsive to said detecting, selectively transmitting high priority slow down messages to ones of said virtual channels;
   responsive to reception of a slow down message in one virtual channel, decreasing a limit on at least one of a peak rate and an average rate of transmission of data on said one virtual channel;
   responsive to receiving a request for transmission from a virtual channel to said network, said request comprising requested bandwidth parameters, determining whether said request can be accommodated without overloading said network;
   responsive to determining that said request cannot be accommodated without overloading said network, transmitting to the requesting virtual channel a response message comprising at least one bandwidth parameter for a bandwidth lower than a bandwidth for said bandwidth parameters received in said request message;
   monitoring a rate of transmission from virtual channels of said broadband data network; and
   responsive to detecting, in said monitoring step, a transmission rate for one of said virtual channels being monitored in excess of a rate assigned by said transmission rate parameters to the one of said virtual channel being monitored, transmitting a slow down message to said one of said virtual channels being monitored;
   wherein said limit on an average rate of transmission of data is specified by providing a leaky bucket drain rate parameter;

wherein said bandwidth parameters received in said request message comprises at least one of a parameter specifying a maximum number of cells which may be transmitted during a prespecified interval, a parameter specifying a maximum number of cells which may be transmitted during an interval specified in said message, and a fill rate parameter for a leaky bucket transmission rate limit;

wherein said ones of said virtual channels to which slow down messages are transmitted are selected on the basis of at least one of a priority of said ones of said virtual channels, bandwidth of said ones of said virtual channels, activity of said ones of said virtual channels, and internal buffer occupancy of said ones of said virtual channels;

wherein each of said slow down messages is activated for one of a parameter of a slow down message defining a length of time for which a message is to be activated, a predetermined interval of time, and an indefinite interval of time, and is subject to deactivation upon receipt of a restore message.

31. In a data network connected via an ingress switch to a plurality of data terminals each for serving at least one virtual channel, said ingress switch having a capability for serving a maximum data traffic load from said data terminals and from said network, apparatus for throttling input to the network, comprising:

processor means, operative under the control of a program, for detecting in said ingress switch of said data network that a load submitted from said data terminals and from said network exceeds said maximum data traffic load; and responsive to said detecting, said processor means further under the control of a program for selectively transmitting slow down messages, for changing at least one parameter, used for controlling the rate of transmission of data over a virtual channel, in a direction to reduce said rate of transmission, to ones of said virtual channels.

32. The apparatus of claim 31 wherein said network supports priority message service and wherein said selectively transmitting comprises selectively transmitting slow down messages at a high priority level.

33. In a data network connected to a plurality of data terminals each for serving at least one virtual channel, apparatus for throttling input to the network, comprising:

processor means, operative under the control of a program, for detecting an overload in said data network; and responsive to said detecting, said processor means further under the control of a program for selectively transmitting slow down messages, for changing at least one parameter, used for controlling the rate of transmission of data over a virtual channel, in a direction to reduce said rate of transmission, to ones of said virtual channels;

wherein said network is a broadband data network, transmitting data in cells, and wherein said selectively transmitting high priority messages comprises transmitting said high priority messages as groups of high priority cells.

34. The apparatus of claim 31 wherein ones of said virtual channels are assigned transmission rate parameters for limiting a rate of transmission from said ones of said virtual channels, further comprising processor means, operative under the control of a program, for monitoring a rate of transmission from said ones of said virtual channels.

35. The apparatus of claim 34 further comprising:
processor means, operative under the control of a program, and responsive to detecting, in said monitoring means, a transmission rate for one of said terminals in excess of a rate assigned by said transmission rate parameters to said one of said virtual channels, for transmitting a slow down message to said one terminal.

36. The apparatus of claim 34 further comprising:
processor means, operative under the control of a program, responsive to detecting, in said monitoring step, a transmission rate for one of said terminals in excess of a rate assigned by said transmission rate parameters to said one of said virtual channels, for disconnecting said one virtual channel.

37. In a data network connected to a plurality of data terminals each for serving at least one virtual channel, apparatus for throttling input to the network, comprising:

processor means, operative under the control of a program, for detecting an overload in said data network; and responsive to said detecting, said processor means further under the control of a program for selectively transmitting slow down messages, for changing at least one parameter, used for controlling the rate of transmission of data over a virtual channel, in a direction to reduce said rate of transmission, to ones of said virtual channels;

said processor means, operative under the control of a program, responsive to receiving a request message for transmission from a virtual channel to said network, said request comprising at least one requested bandwidth parameter, for determining whether said request can be accommodated without overloading said network;

said processor means, operative under the control of a program, responsive to said means for determining, determining that said request cannot be accommodated without overloading said network, for transmitting to said virtual channel a response message comprising at least one bandwidth parameter for a bandwidth lower than a bandwidth for said at least one bandwidth parameter received in said request message.

38. In a data network connected to a plurality of data terminals each for serving at least one virtual channel, apparatus for throttling input to the network, comprising:

processor means, operative under the control of a program, for detecting an overload in said data network; and responsive to said detecting, said processor means further under the control of a program for selectively transmitting slow down messages, for changing at least one parameter, used for controlling the rate of transmission of data over a virtual channel, in a direction to reduce said rate of transmission, to ones of said virtual channels;

said processor means, operative under the control of a program, responsive to receiving a request message for transmission from a virtual channel, said request comprising at least one requested bandwidth parameter, for determining whether said request can be accommodated without overloading said network; and said processor means, operative under the control of a program, responsive to a determination that said request cannot be accommodated without overloading said network, for transmitting to said virtual channel a reject response message.

39. In a data network connected via an ingress switch to a plurality of data terminals each for serving at least one virtual channel, apparatus for throttling input to the network, comprising:

processor means, operative under the control of a program, for detecting an overload in said ingress switch of said data network; and responsive to said detecting, said processor means further under the control of a program for selectively transmitting slow down messages, for changing at least one parameter, used for controlling the rate of transmission of data over a virtual channel, in a direction to reduce said rate of transmission, to ones of said virtual channels;

wherein said network supports a plurality of priority levels for different virtual channels, and wherein said means for selectively transmitting selects said ones of said virtual channels to which slow down messages are transmitted on the basis of a priority of said ones of said virtual channels.

40. The apparatus of claim 31 wherein said means for selectively transmitting selects said ones of said virtual channels on the basis of bandwidth of said ones of said virtual channels.

41. The apparatus of claim 31 wherein said means for selectively transmitting selects said ones of said virtual channels on the basis of activity of said ones of said virtual channels.

42. The apparatus of claim 31 wherein said means for selectively transmitting selects said ones of said virtual channels on the basis of internal buffer occupancy of said ones of said virtual channels.

43. In a data network connected to a plurality of data terminals, each for serving at least one virtual channel, a method of throttling input to the network comprising the steps of:

responsive to receiving a request for transmission from a virtual channel to said network, said request comprising at least one requested bandwidth parameter, determining whether said request can be accommodated without overloading said network;

responsive to determining that said request cannot be accommodated without overloading said network, transmitting to said terminal a response message comprising at least one bandwidth parameter for a bandwidth lower than a bandwidth for said at least one bandwidth parameter received in said request message;

wherein said network is a broadband network transmitting data in cells;

wherein said at least one bandwidth parameter received in said request message comprises a minimum intercell spacing parameter.

44. In a data network connected to a plurality of data terminals, each for serving at least one virtual channel, a method of throttling input to the network comprising the steps of:

responsive to receiving a request for transmission from a virtual channel to said network, said request comprising at least one requested bandwidth parameter, determining whether said request can be accommodated without overloading said network;

responsive to determining that said request cannot be accommodated without overloading said network, transmitting to said terminal a response message comprising at least one bandwidth parameter for a bandwidth lower than a bandwidth for said at least one bandwidth parameter received in said request message;

wherein said network is a broadband network transmitting data in cells;

wherein said at least one bandwidth parameter received in said request message comprises parameters, including a fill rate parameter, for a leaky bucket transmission rate limit.

* * * * *